United States Patent
Venkataraman

(10) Patent No.: US 11,615,546 B2
(45) Date of Patent: Mar. 28, 2023

(54) SYSTEMS AND METHODS FOR DEPTH ESTIMATION USING GENERATIVE MODELS

(71) Applicant: Adeia Imaging LLC, San Jose, CA (US)

(72) Inventor: Kartik Venkataraman, San Jose, CA (US)

(73) Assignee: Adeia Imaging LLC, San Jose, CA (US)

(*) Notice: Subject to any disclaimer, the term of this patent is extended or adjusted under 35 U.S.C. 154(b) by 82 days.

(21) Appl. No.: 17/331,428

(22) Filed: May 26, 2021

(65) Prior Publication Data

US 2021/0358154 A1 Nov. 18, 2021

Related U.S. Application Data

(63) Continuation of application No. 16/269,108, filed on Feb. 6, 2019, now Pat. No. 11,024,046.

(60) Provisional application No. 62/627,650, filed on Feb. 7, 2018.

(51) Int. Cl.
*G06T 7/55* (2017.01)
*G06T 7/70* (2017.01)
*G06N 3/04* (2023.01)

(52) U.S. Cl.
CPC .............. *G06T 7/55* (2017.01); *G06N 3/0454* (2013.01); *G06T 7/70* (2017.01)

(58) Field of Classification Search
CPC ... G06T 7/55; G06T 7/70; G06T 2207/20084; G06N 3/0454; G06N 3/0472; G06N 3/08
See application file for complete search history.

(56) References Cited

U.S. PATENT DOCUMENTS

| | | |
|---|---|---|
| 8,619,082 B1 | 12/2013 | Ciurea et al. |
| 8,902,321 B2 | 12/2014 | Venkataraman et al. |
| 9,519,972 B2 | 12/2016 | Venkataraman et al. |
| 11,024,046 B2 | 6/2021 | Venkataraman |
| 2014/0267633 A1* | 9/2014 | Venkataraman ........ G06T 7/579 348/48 |
| 2015/0302592 A1* | 10/2015 | Bruls ........................ G06T 7/50 348/44 |

(Continued)

OTHER PUBLICATIONS

Godar et al, ("Unsupervised Monocular Depth Estimation with Left-Right Consistency", 2017 IEEE) (Year: 2017).*

(Continued)

*Primary Examiner* — Amara Abdi
(74) *Attorney, Agent, or Firm* — KPPB LLP

(57) ABSTRACT

Systems and methods for depth estimation in accordance with embodiments of the invention are illustrated. One embodiment includes a method for estimating depth from images. The method includes steps for receiving a plurality of source images captured from a plurality of different viewpoints using a processing system configured by an image processing application, generating a target image from a target viewpoint that is different to the viewpoints of the plurality of source images based upon a set of generative model parameters using the processing system configured by the image processing application, and identifying depth information of at least one output image based on the predicted target image using the processing system configured by the image processing application.

20 Claims, 10 Drawing Sheets

(56) References Cited

U.S. PATENT DOCUMENTS

| | | | | |
|---|---|---|---|---|
| 2016/0309134 A1* | 10/2016 | Venkataraman | ..... | H04N 5/2258 |
| 2016/0350930 A1* | 12/2016 | Lin | ........................ | G06V 10/82 |
| 2017/0244960 A1 | 8/2017 | Ciurea et al. | | |
| 2018/0376122 A1* | 12/2018 | Park | ...................... | H04N 13/128 |
| 2019/0122378 A1* | 4/2019 | Aswin | .................. | G06V 10/462 |
| 2019/0197735 A1 | 6/2019 | Xiong et al. | | |
| 2019/0244379 A1 | 8/2019 | Venkataraman | | |

OTHER PUBLICATIONS

Garg et al., "Unsupervised CNN for Single View Depth Estimation: Geometry to the Rescue", In European Conference on Computer Vision, Springer, Cham, Jul. 2016, 16 pgs.

Godard et al., "Unsupervised Monocular Depth Estimation with Left-Right Consistency", In Proceedings of the IEEE Conference on Computer Vision and Pattern Recognition, 2017, 14 pgs.

Goodfellow et al., "Generative Adversarial Nets", 2014. Generative adversarial nets. In Advances in neural information processing systems (pp. 2672-2680).

Zbontar et al., "Computing the Stereo Matching Cost with a Convolutional Neural Network", CVPR, 2015, 8 pgs.

\* cited by examiner

SYSTEMS AND METHODS FOR DEPTH ESTIMATION USING GENERATIVE MODELS

CROSS-REFERENCE TO RELATED APPLICATIONS

The current application is a continuation of U.S. patent application Ser. No. 16/269,108 entitled "Systems and Methods for Depth Estimation Using Generative Models" filed Feb. 6, 2019, which claims the benefit of and priority under 35 U.S.C. § 119(e) to U.S. Provisional Patent Application No. 62/627,650 entitled "Systems and Methods for Depth Estimation Using Generative Models" filed Feb. 7, 2018. The disclosures of U.S. patent application Ser. No. 16/269,108 and U.S. Provisional Patent Application No. 62/627,650 are hereby incorporated by reference in their entirety for all purposes.

FIELD OF THE INVENTION

The present invention generally relates to depth maps and, more specifically, use of machine learning to train systems to generate disparity and/or depth maps.

BACKGROUND

Images can be analyzed to generate depth maps that describe the relative depth of pixels in a described image. Depth maps can be generated based on differences in images captured from different perspectives. These differences can be measured as the disparity between specific features in the images captured from different viewpoints. Disparity is inversely proportional to distance. Furthermore, the disparity between the location of an object observed in images captured by two or more cameras from different viewpoints can be predicted based upon knowledge of the baseline of the cameras and the distance to the object within the scene. A number of systems are able to determine depths for pixels in an image based on the disparity or shift in location pixels in a first image from a first viewpoint relative to the position of the corresponding pixels in a second image from a second viewpoint. Such methods are effective, but are typically limited in their ability to calculate depth when no corresponding pixel exists in the second image (e.g., when the corresponding pixel is occluded or otherwise not visible from the second viewpoint).

SUMMARY OF THE INVENTION

Systems and methods for depth estimation in accordance with embodiments of the invention are illustrated. One embodiment includes a method for estimating depth from images. The method includes steps for receiving a plurality of source images captured from a plurality of different viewpoints using a processing system configured by an image processing application, generating a target image from a target viewpoint that is different to the viewpoints of the plurality of source images based upon a set of generative model parameters using the processing system configured by the image processing application, and identifying depth information of at least one output image based on the predicted target image using the processing system configured by the image processing application.

In a further embodiment, the at least one output image is the generated target image from the target viewpoint.

In still another embodiment, the at least one output image is an image from the plurality of source images.

In a still further embodiment, receiving the plurality of source images includes receiving a first image captured from a first viewpoint and a second image captured from a second viewpoint that is different to the first viewpoint.

In yet another embodiment, the target viewpoint is a center viewpoint located between the first and second viewpoints.

In a yet further embodiment, the center viewpoint is aligned with the first and second viewpoints along a center line.

In another additional embodiment, the center viewpoint is offset from a center line between the first and second viewpoints.

In a further additional embodiment, the processing system is configured to implement an image generation model using the set of generative model parameters stored in the memory of the processing system.

In another embodiment again, the image generation model includes at least one computational model selected from the group consisting of neural network trained as a generative adversarial network (GAN), a convolutional neural network (CNN), a Boltzmann machine, and a deconvolutional network.

In a further embodiment again, identifying depth information includes performing a disparity based depth estimation method to identify depths for pixels in at least one image from the plurality of source images using the processing system configured by the image processing application.

In still yet another embodiment, the at least one image is a first image from the plurality of source images, wherein identifying depth information includes calculating depth information for pixels in the first image based on pixel shifts between pixels of the first image and corresponding pixels of a second image from the plurality of source images using the processing system configured by the image processing application.

In a still yet further embodiment, the calculated depth information is an initial set of depth information, wherein identifying depth information further includes refining the calculated depth information for pixels in the first image based on pixel shifts between pixels of the first image and corresponding pixels of the target image using the processing system configured by the image processing application.

In still another additional embodiment, the at least one image is a first image of the plurality of source images, wherein identifying depth information of the first image includes calculating depth information for the first image based on pixel shifts between pixels of the first image and corresponding pixels of the target image using the processing system configured by the image processing application.

In a still further additional embodiment, the method further includes steps for calibrating the received set of source images prior to generating the target image using the processing system configured by the image processing application.

In still another embodiment again, calibrating the received set of source images includes using the processing system configured by the image processing application to perform at least one of unskewing, sharpening, perspective adjustment, adjusting faulty pixels, and noise reduction.

In a still further embodiment again, the method further includes steps for training an image generation model to generate images from the target viewpoint using a training processing system configured by a training application.

In yet another additional embodiment, training the image generation model comprises capturing a plurality of training images from at least three viewpoints, wherein the captured training images includes a plurality of source images and at least one target image, generating new target images from the set of source images based upon a set of generative model parameters using the training processing system configured by the training application, and comparing at least one generated target image with the captured at least one target image and adjusting the generative model parameters based upon the comparison using the training processing system configured by the training application.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data 'graphs, which are presented as exemplary embodiments of the invention and should not be construed as a complete recitation of the scope of the invention.

DETAILED DESCRIPTION

Turning now to the drawings, systems and methods for detecting disparity and/or depth from a plurality of images in accordance with various embodiments are illustrated. As technology advances, the amount of image information that becomes available continues to increase at an amazing rate. In particular, the availability of images captured from multiple perspectives (such as (but not limited to) images captured by an image array and dual camera systems) is becoming increasingly common. Dual camera systems are being increasingly adopted for small form factor camera applications (e.g. mobile phone handsets), due to the ability to provide each camera with a specific set of imaging characteristics and using computational imaging techniques to combine image data captured by the dual cameras. One particular feature that such dual camera systems have made possible is the detection of disparity and/or depth using the image data captured by the cameras.

Disparity and Occlusions

Depth or disparity information generated using a dual camera system often suffers from large areas of the image where the depth cannot be clearly identified, often resulting in a depth map that is inaccurate, particularly around the edges of objects in the images. These regions are often referred to as occlusion zones or occluded regions and the inaccuracy in depth stems from the fact that some or all of these regions are only visible to one of the cameras. As a result, attempts to generate depth or disparity information by matching pixels in the occluded region in the second image introduce errors into a disparity map or a depth map as there is no matching pixel to be found. Many depth estimation techniques utilize smoothing processes such as (but not limited to) bilateral filtering and/or semi-global matching in an attempt to limit the impact of unreliable depth estimates in occlusion zones. However, reliance on disparity as the only depth queue ultimately limits the extent to which accurate depth information can be obtained in the absence of corresponding pixels in a pair of images.

Figure 1:
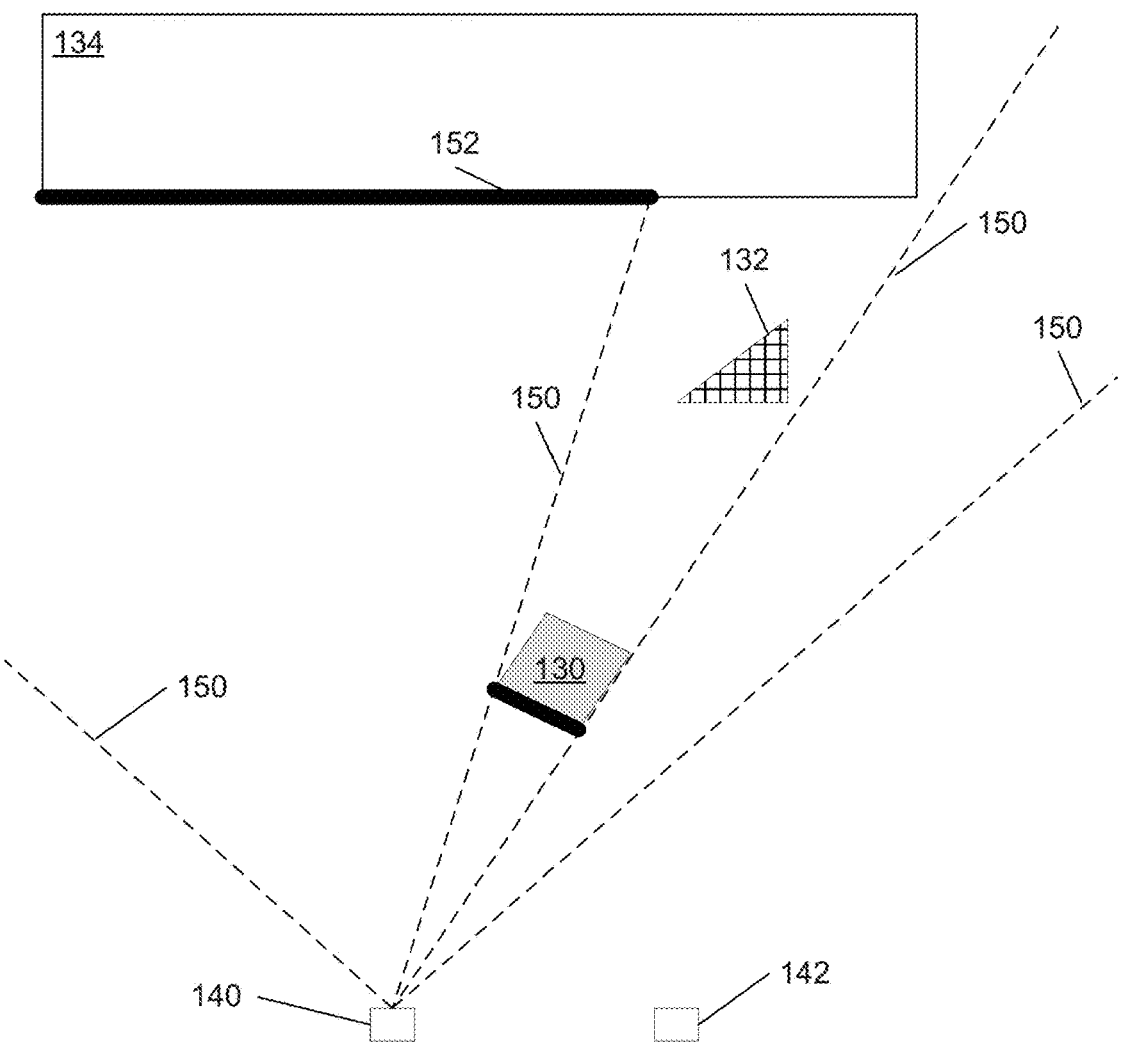
FIGS. 1-6 illustrate different viewpoints of a scene.

An example of corresponding and occluded pixels from different viewpoints is illustrated in FIGS. 1-6. FIG. 1 shows an overhead view 100. Overhead view 100 shows an overhead view of a left camera 140 and a right camera 142 that capture images of a set of objects 130-134. In this example, thin dashed lines 150 in the overhead view represent the field of view from a particular perspective. Left and right cameras in accordance with several embodiments of the invention are part of an array camera. In numerous embodiments, the cameras are a known distance apart, with a known orientation with respect to each other. Although many of the examples described in this application refer to left and right cameras, one skilled in the art will recognize that the systems and processes described herein can be adapted to a variety of different camera setups with varying numbers, orientations, and/or positions of the cameras. In overhead view 100, the thin dashed lines represent the line of sight from the left camera 140, while the dark lines 152 represent the surfaces of the objects 130-134 that are visible within the field of view of the left camera 140. In this example, object 132 is completely obscured by object 130, so none of the surfaces of object 132 are shown with any dark lines.

Figure 2:
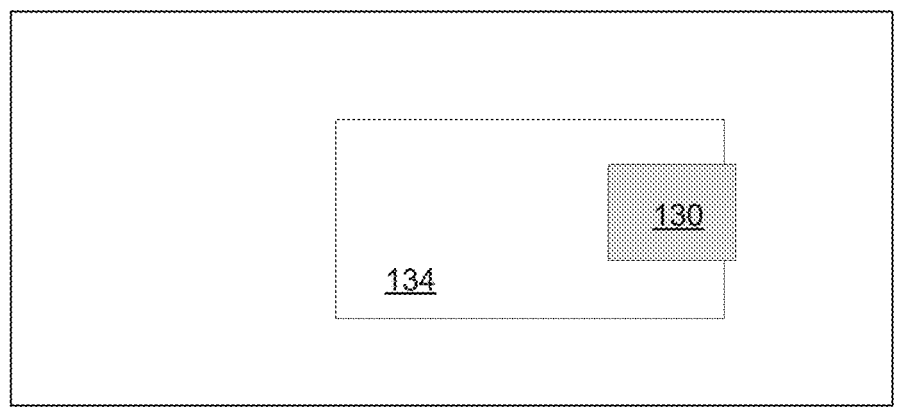

A corresponding left camera view 200 is shown in FIG. 2. Left camera view 200 shows a view of the set of objects 130 and 134 from within the field of view of the left camera 140. The objects 130 and 134 are illustrated with the same patterns in both the overhead view 110 and the left perspective view 120. Object 130 is shown with a shaded surface and object 134 is shown unshaded. Again, object 132 is completely obscured by 130, so only objects 130 and 134 are visible within the field of view of the left camera 140.

Figure 3:
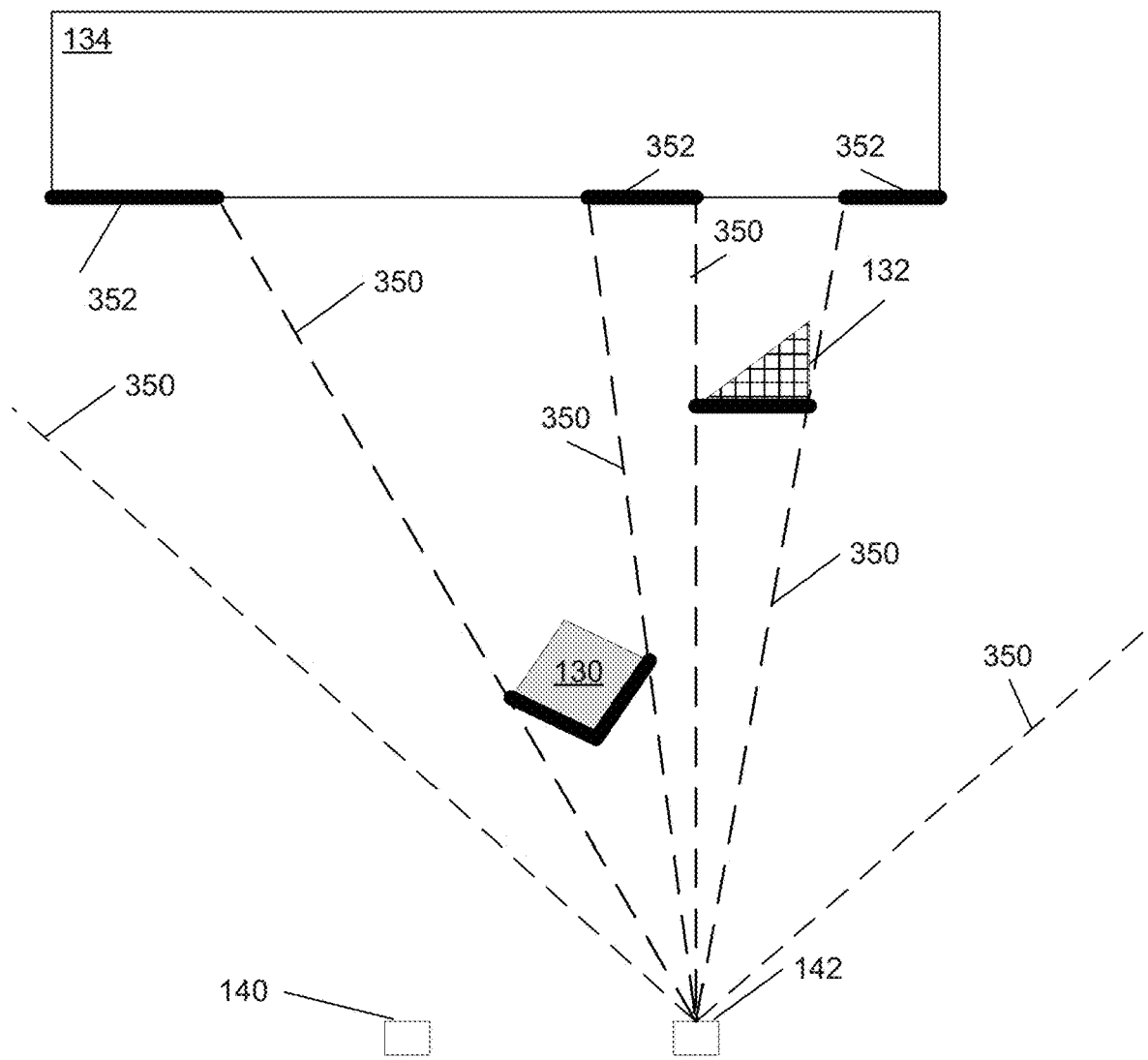
Figure 4:
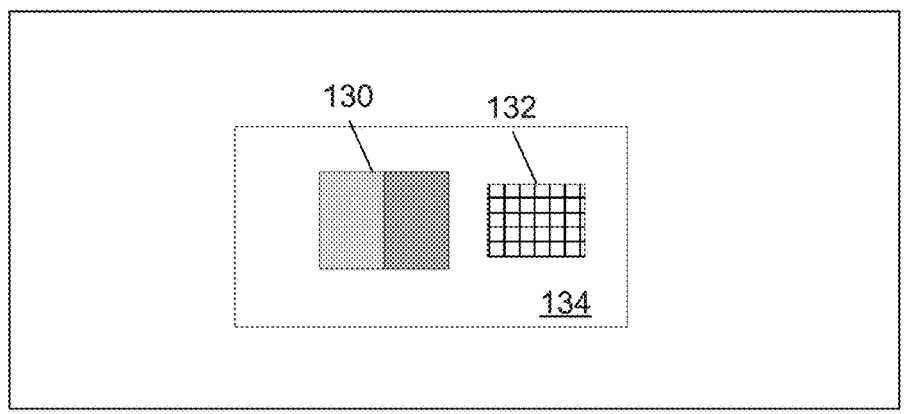

FIGS. 3 and 4 are similar to FIGS. 1 and 2 respectively, but illustrate the locations of the objects within the field of view of the right camera 142. Overhead view 300 of FIG. 3 shows an overhead view of the left camera 140 and the right camera 142 that capture images of a scene containing objects 130-134. In overhead view 300, the thin dashed lines 350 represent the line of sight from the right camera 142, while the dark lines 352 represent the surfaces of the objects 130-134 that are visible within the field of view of the right camera 142. In this view, two surfaces of object 130 are visible, as well as portions of surfaces of objects 132 and 134.

Right camera view 400 shows a field of view of the scene containing the set of objects 130-134 as captured by the right camera 142. From the right camera view 400, two surfaces of object 130 (shown with shaded surfaces), a single surface of object 132 (shown with crossed lines) and portions of a single surface of 134 (shown in white) are now visible.

Parallax based depth estimation techniques can be applied to images of a scene captured by different perspective views in order to determine disparity and/or depth for each pixel within the images. In some embodiments, a known distance between different perspectives and/or an orientation of the perspectives with respect to each other, are used in conjunction to calculate parallax based depth estimates based on the disparity between corresponding pictures in the image data captured by the two cameras.

As can be seen in the example of FIGS. 2 and 4, there are many pixels that may not have a corresponding pixel in the two images captured by the left and right cameras 140 and 142. For example, the surface of object 132 is only visible from the right camera view 400, so there is no corresponding pixel in the left camera view 200. This will often cause any attempt to calculate the depth of pixels within the crossed region to fail, because there is no corresponding pixel in the left camera view 200 from which to calculate the corresponding pixel shift.

Use of Machine Learning in Depth Estimation

A limitation of disparity based depth estimation techniques is that they typically rely solely upon disparity based depth cues to estimate depth (often with smoothing and/or edge preserving filtering). Natural scenes tend to include a variety of depth cues that can include (but are not limited to) defocus, reflections from sources of illumination, shadows, and/or relative size and arrangement of specific types of objects within the scene. A variety of machine learning techniques have been developed for use in object identification and/or classification in image processing applications including (but not limited to) convolutional neural networks and capsule networks that learn features that can be utilized to perform a specific image processing task based upon training data annotated with ground truth information.

Systems and methods in accordance with many embodiments of the invention utilize machine learning techniques to generate depth information from images captured by an array camera. In certain embodiments, a class of model known as a generative model is utilized that generates an image, a depth map, and/or a disparity map based upon a set of input images. In many embodiments, the image processing system trains a generative model such as (but not limited to) a convolutional neural network, a restricted Boltzmann machine, and/or a capsule network using a pair of images to generate a third image from a third viewpoint. As is discussed further below, using a set of ground truth training data captured using three cameras provides the image processing system with training data from which the generative models can learn depth cues that can be relied upon to accurately estimate depth in occlusion zones (i.e. regions of the scene captured in only one of the images). In this way, the image processing system is capable of generating more accurate depth maps than systems that primarily rely upon disparity. A generative model trained in this way can be utilized to generate a disparity map using images captured by a pair of cameras.

In a number of embodiments, the generative model can be trained using a generative adversarial network in which the generative model generates an image from the viewpoint of the additional camera and a second neural network evaluates the similarity between the generated image and evaluates the accuracy of the generated images in predicting the ground truth image captured by the additional camera. The disparity map can be from a virtual viewpoint (e.g. the viewpoint of the third camera used to capture the ground truth information for the training data set) and can be either directly warped into the viewpoint of one of the cameras or converted into a depth map and warped into the viewpoint of one of the cameras. In this way, training data acquired using an array of three or more cameras can be utilized to train generative models that can be utilized to generate disparity and/or depth maps in arrays having as few as two cameras. The benefits of utilizing a third camera to acquire ground truth image data can be appreciated by comparing the configurations illustrated in FIGS. 1-4 with the configuration shown in FIGS. 5 and 6.

In order to estimate disparity and/or depth, processes in accordance with a number of embodiments of the invention use an image from an additional viewpoint to provide ground truth training data. In the case of a system based upon a stereo pair of cameras, a third camera can be utilized to generate ground truth images for use in the training of a generative model designed to generate a disparity map and/or depth map from images captured by the stereo pair of cameras. In many embodiments, the training data utilizes the input images, the images generated by the generative model from the viewpoint of the additional camera, and the images captured by the additional camera to optimize the parameters of the generative model. In several embodiments, the additional image is captured from a viewpoint located between the pair of cameras that provide input image data to the generative model. In other embodiments, the additional camera can be located in any of a variety of locations relative to cameras in an array of cameras that capture image data used as inputs of a generative model as appropriate to the requirements of a given application.

Figure 5:
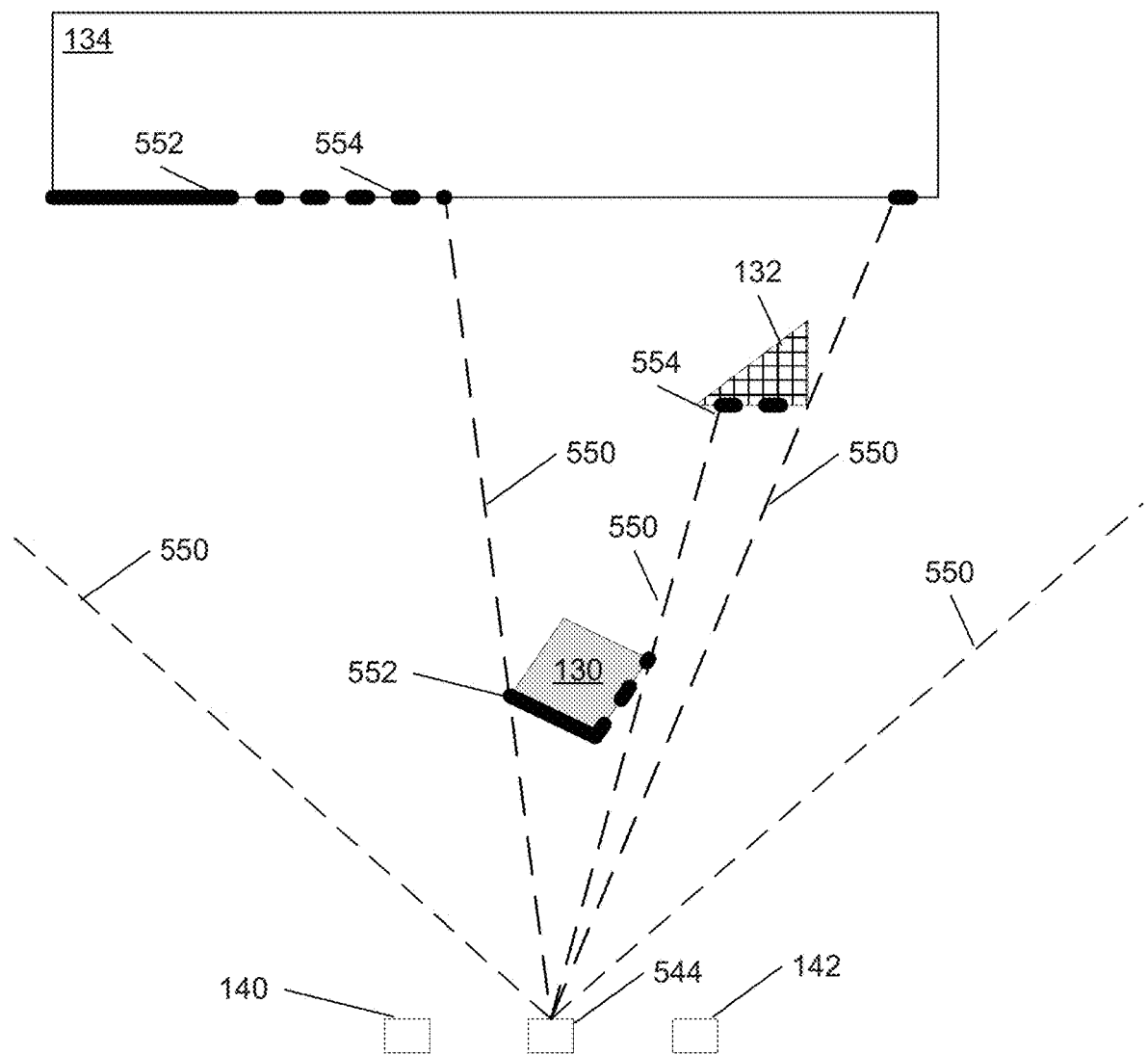
Figure 6:
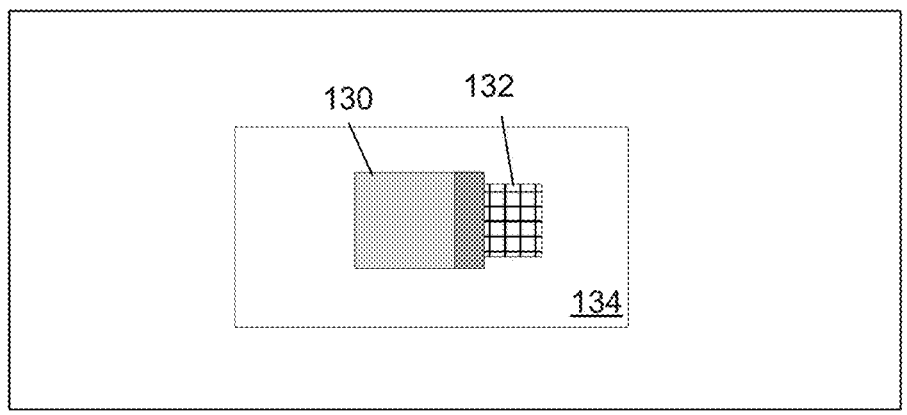

The visibility of objects from the viewpoint of a center camera relative to the visibility of the objects from the viewpoints of a left camera and a right camera can be appreciated from FIGS. 5 and 6. Overhead view 500 shows an overhead view of a center camera 144 that captures images of a scene including an arrangement of a set of objects 130-134. In overhead view 114, the thin lines 550 represent the line of sight from the center camera 144, while the dark lines 552 represent the surfaces of the objects 130-134 that are visible within the field of view of the center camera 144. In this view, two surfaces of object 130 are visible, as well as portions of surfaces of objects 132 and 134. From the field of view of the central camera, the visible surfaces captured by all three cameras 140-144 are shown with thick solid lines 552. Surfaces captured by center camera 144 and only one of the left or right cameras are shown with thick dotted lines 554.

Center camera view 600 shows a view of the set of objects 130-134 as captured by the center camera 144. From the center camera view 124, two surfaces of object 130 (shown with shaded surfaces), a single surface of object 132 (shown with crossed lines) and portions of a single surface of 134 (shown in white) are now visible. As shown, center camera view 600 shows pixels that correspond to surfaces captured by the center camera 144 that are occluded in one of the left or right cameras. For example, object 132, which has no corresponding pixels in left perspective view 120, is visible in the center perspective view.

The presence of corresponding pixels for surfaces of objects visible in an image captured by the first camera, which are occluded in an image captured by a second camera, in the image captured by an additional camera allows depth estimation to be performed for pixels in the first image that would otherwise be sources of depth estimation error due to occlusion in the second image. Further, even when a surface is visible from multiple viewpoints, it is often difficult to computationally identify corresponding pixels at the edges of objects. In such cases, the pixels of the occluded surfaces from a center perspective can be particularly valuable as they can provide additional information at the edges of an object.

As noted above, images captured by a central camera can be utilized as ground truth to train a generative model using machine learning techniques. In a number of embodiments, the central camera has higher resolution than the left camera and/or the right camera to enable training of a generative model that has sub-pixel precision relative to the resolution of one or more of the input images. In several embodiments of the invention, the training and implementation of generative models that include any of (but are not limited to) convolutional neural networks (CNNs), deconvolutional networks, restricted Boltzmann machines, deep Boltzmann machines, and generative adversarial networks (GANs). Training GANs in accordance with some embodiments of the invention is described in Generative Adversarial Networks (Goodfellow et al., 2014, https://arxiv.org/pdf/1406.2661.pdf), the disclosure of which is hereby incorporated by reference in its entirety.

Depth Estimation Using Generative Models

Depth estimation systems in accordance with a number of embodiments of the invention can capture images of a scene from multiple viewpoints to train generative models and/or to estimate disparity and/or depths for pixels within the captured images. In many embodiments, generative models can be utilized with respect to the captured images to generate a predicted image to estimate and/or refine disparity and/or depth estimates for the received images. In some embodiments, depth estimates are made for the pixels of the predicted image. In a number of embodiments, depth estimates generated with respect to the predicted image can be warped into the viewpoint of one of the cameras to provide a depth map for the image captured by the camera. Depth estimation systems can be implemented on a variety of devices and/or across multiple devices. Much of the discussion that follows refers to depth estimation. However, a person of ordinary skill in the art will readily appreciate that disparity and depth are related and that systems in accordance with various embodiments of the invention can be configured to use generate models to generate depth and/or disparity information.

Figure 7:
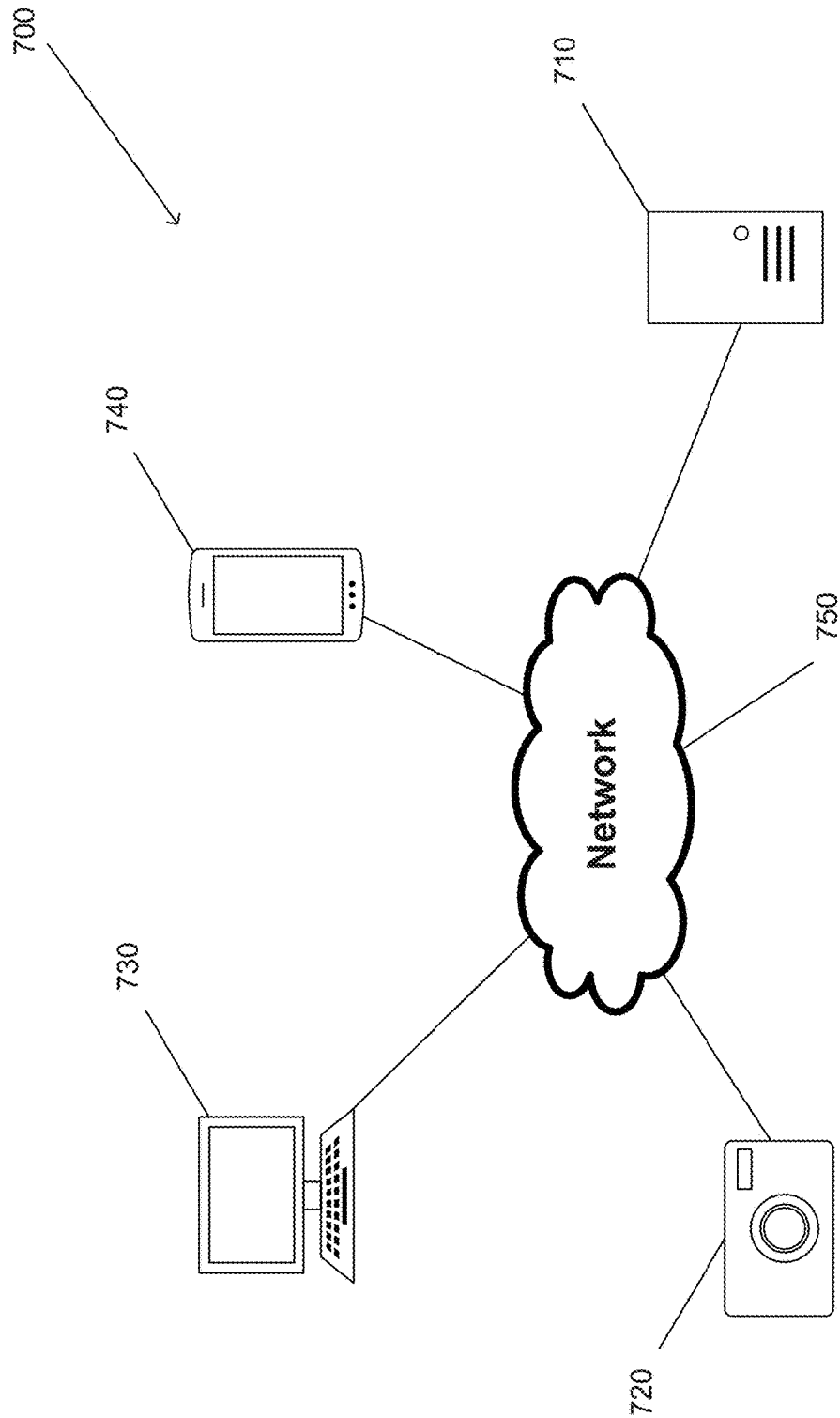
FIG. 7 illustrates a depth estimation in accordance with an embodiment of the invention.

Turning now to FIG. 7, a depth estimation system is illustrated in accordance with an embodiment of the invention. Depth estimation system 700 can include an image processing device 710. In many embodiments, image processing devices are image processing servers containing at least a processor, and memory. In some embodiments, image processing devices have a communications port configured to communicate with other devices over a network 750. While image processing devices can be implemented on server systems, image processing devices can be made using Field Programmable Gate Arrays, Application-Specific Integrated Circuits, smart phones, personal computers, or any other computing system as appropriate to the requirements of a given application. Image processing devices in accordance with several embodiments of the invention include devices that train generative models to predict images from different perspectives and/or devices that utilize trained generative models to estimate image depths based on predicted images. In certain embodiments, the training and utilization of the models are performed by a single image processing device.

Depth estimation system 700 further includes at least one camera system 720 capable of generating a depth map. In many embodiments, the at least one camera system is an array camera or array of cameras. Array cameras can be made of two or more image sensors a known, fixed distance apart. However, any number of image capture devices capable of generating a depth map can be used as appropriate to the requirements of a given application. Cameras in accordance with some embodiments include training image data capture devices that are specialized devices for capturing image data for training a generative model for predicting images from different perspectives.

Depth estimation systems can have display devices such as, but not limited to, personal computers 730, smart phones 740, or any other device capable of displaying visual information as appropriate to the requirements of a given application. Display devices can be used to visualize or interact with depth information of images generated by depth estimation systems. For example, in some embodiments display devices can be used to perform depth-based edits to images based on estimated depth information.

In numerous embodiments, devices that are part of the depth estimation system have at least one communications port capable of transmitting data over a network 750. In many embodiments, communications ports can transmit data wirelessly over a network using a wireless communications protocol such as, but not limited to, IEEE 802.11 (WiFi), IEEE 802.15 (Bluetooth), or any other wireless communications protocol as appropriate to the requirements of a given application. In numerous embodiments, communications ports can transmit data over wired networks, or a combination of wireless and wired networks. In a variety of embodiments, the network is the Internet, a Local Area Network, a Wide Area Network, and/or any other network as appropriate to the requirements of a given application. Further, in numerous embodiments, image processing devices and display devices can be integrated into the same machine. In many embodiments, a single machine can house an image processing device, a display device, and a camera. In fact, any combination of devices in a depth estimation system can be implemented on at least one machine. Depth estimation systems in accordance with various embodiments of the invention are discussed below.

Depth Estimation Training

Figure 8:
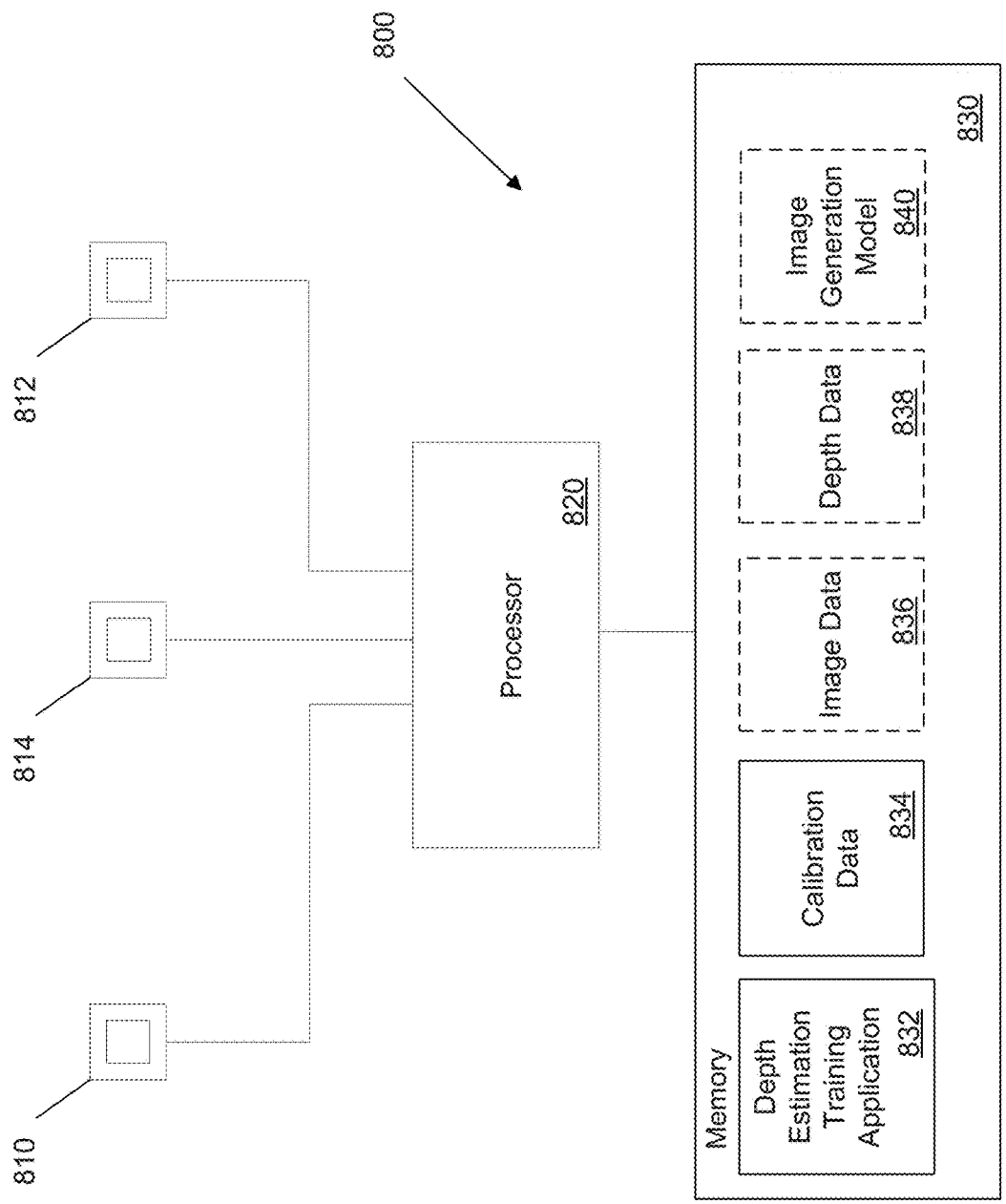
FIG. 8 illustrates a depth estimation training system in accordance with an embodiment of the invention.

In order to estimate depth information using a generative model, depth estimation systems in accordance with some embodiments of the invention capture training image data and train the generative model based on the training image data to predict images for depth calculations. In many embodiments, a training system is used to train a generative model that is then provided to a depth estimation system for use in performing depth estimation using input data captured using an array camera. A depth estimation training system in accordance with an embodiment of the invention is conceptually illustrated in FIG. 8.

Depth estimation training system 800 can include one or more cameras 810, 812, and 814 for capturing training image data. In this example, cameras 810 and 812 are source cameras that capture image data from a number of source perspectives, while camera 814 is a target camera (or cameras) that captures image data from one or more target perspectives. In some embodiments, source cameras are stereo (i.e., left and right) cameras that capture left and right views of a scene, while the target camera captures a center view of the scene. Various arrangements for cameras in accordance with several embodiments of the invention are described below with reference to FIGS. 9-12.

Cameras in depth estimation training systems (and depth estimation systems) can utilize one or more subsets of cameras having different baseline distances between cameras as needed for accurately determining depth. In many embodiments, multiple view images can be captured as a sequence of images using a single moving camera, where the baseline between captured images is estimated. In many embodiments that incorporate an array of two or more cameras that each capture a view of the same scene (e.g. have at least partially overlapping fields of view), the cameras are arranged a known, fixed distance apart. In certain embodiments, the fixed distance is known prior to capture of the images. In several embodiments, a determination of the fixed distance is made dynamically using the captured image data. The disclosure of U.S. Patent Publication 2017/0244960 including the relevant disclosures concerning a dynamic calibration process are hereby incorporated by reference in their entireties. In numerous embodiments, multiple camera arrays are used. Cameras in a given array can have different lens types, focal lengths, image sensors, image capture settings, and/or any other camera parameter as appropriate to the requirements of a given application. In numerous embodiments, a stereo pair of cameras are used. However, any orientation and/or number of cameras can be used along with any combination of camera types including cameras that utilize Bayer filters, WRGB, and/or RGB near-IR color filter patterns. In numerous embodiments, array cameras are integrated into a mobile device. Different types of array cameras are described in U.S. Pat. No. 8,902,321 entitled "Capturing and Processing of Images Using Monolithic Camera Array with Heterogeneous Imagers," and U.S. Patent Publication 2016/0309134 entitled "Multi-Baseline Camera Array System Architectures for Depth Augmentation in VR/AR Applications." The disclosures of U.S. Pat. No. 8,902,321 and U.S. Patent Publication 2016/0309134 including the relevant disclosures concerning camera arrays and the construction of camera arrays are hereby incorporated by reference in their entireties.

Depth estimation training system 800 further includes a processor 820 operatively connected to the one or more cameras and a memory 830. Processors can be, but are not limited to, central processing units (CPUs), graphics processing units (GPUs), machine vision processors, neural network coprocessors, application-specific integrated circuits, field-programmable gate arrays, and/or any other processing unit as appropriate to the requirements of a given application.

Memory 830 can be any machine-readable storage device, including, but not limited to, hard disk drives (HDD), solid state drives (SSD), flash memory, RAM, or any other volatile and/or non-volatile memory type as appropriate to the requirements of a given application. Memory 830 stores a depth estimation training application 832. Depth estimation training applications in accordance with many embodiments of the invention can direct the processor to perform methods for training and/or utilizing image generation models such as (but not limited) to the use of processes for training generative adversarial networks similar to those outlined in the paper to Goodfellow et al., 2014, incorporated by reference above.

Calibration data 834 is stored on memory 830. Calibration data can include photometric and/or geometric calibration data which can be used to rectify images captured by the cameras. However, calibration data can include any type of data which can be utilized to rectify images in accordance with the requirements of a given application. Memory 830 can also contain image data 836 describing a plurality of images taken from different perspectives (or viewpoints). In many embodiments, the image data is captured using one or more source and target cameras.

Memory 830 can also store depth and/or disparity data 838. Depth data can describe the depths of key feature points, depth maps, edge maps, or any other depth information as appropriate to the requirements of a given application. Depth is inversely proportional to disparity, which can be measured by comparing the relative offset along epipolar lines of known features using techniques similar to those outlined above. Depth data in accordance with many embodiments of the invention includes estimated depth data that is calculated based on disparity between source images and predicted target images generated by an image generation model.

Image generation model 840 can also be stored on memory 830. Image generation models can be used to generate predicted target images from the image data of source cameras. Depth estimation training applications can then use predicted target images to train the image generation model by comparing the predicted target images to actual target images captured by target cameras. In some embodiments, the image generation model is trained based on other truth data, including (but not limited to) depth maps generated from depth sensors and/or prediction images generated based on additional source cameras.

While specific implementations of depth estimation training systems have been described above with respect to FIG. 8, there are numerous configurations of depth estimation training systems, including, but not limited to, those using various numbers of cameras (or no cameras at all), using distributed computing systems, and/or any other configuration as appropriate to the requirements of a given application. In numerous embodiments, depth estimation training systems can be implemented in mobile devices, including, but not limited to, cellular telephones, smartphones, tablet computers, laptop computers, and/or any other device as appropriate to the requirements of a given application.

Figure 9:
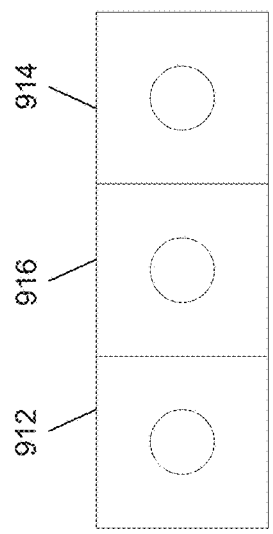
Figure 11:
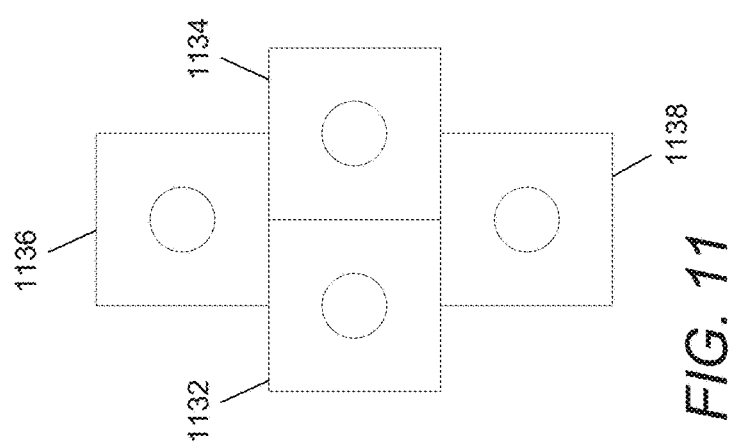

Examples of different camera setups in accordance with some embodiments of the invention are illustrated in FIGS. 9-12. A first setup 900 is illustrated in FIG. 9. Setup 900 includes left and right source cameras 912 and 914 that are aligned with a center target camera 916. In many embodiments, each camera has a lens and a sensor. In other embodiments, the camera can be a multi-aperture camera in which multiple optical channels direct light onto a single sensor containing a large pixel array that captures multiple images or multiple focal planes that independently capture images. As can readily be appreciated, the specific camera configurations are largely dependent upon the requirements of a given application.

Figure 10:
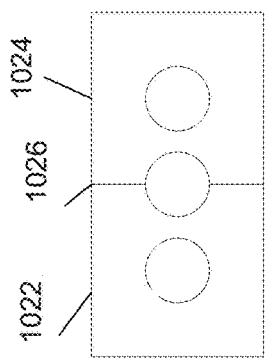
FIGS. 9-12 illustrates a number of different camera arrangements in accordance with different embodiments of the invention.
Figure 12:
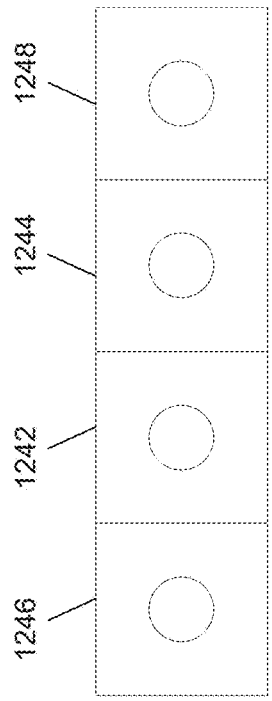

In some cases, devices lack space for a target camera between the left and right cameras. Examples of such instances can include (but are not limited to) mobile phone handsets in which depth and/or disparity information is generated using a generative model using input image data captured by a stereo pair of cameras positioned within a small baseline of each other. A variation on this setup is illustrated in FIG. 10. Setup 1000 shows a setup in which cameras 1022 and 1024 and a target camera 1026 share one or more sensors to enable capture of a target image using a camera module having the same or a substantially similar form factor and baseline of a stereo pair of cameras contained in separate modules. In some embodiments, source and target cameras share a single sensor. In some cases, it is not feasible to capture image data from a center position between two cameras. In a third setup 1100 illustrated in FIG. 11, source cameras 1132 and 1134 are positioned next to each other, while target cameras 1136 and 1138 are offset from (above and below) the source cameras. In certain embodiments, only a single target camera (i.e., above or below) is used to capture a target image. In the third setup 1100, target cameras 1136 and 1138 do not capture an actual target image, but rather images from both cameras are combined (e.g., using an image generation model) to build a composite target image. In some embodiments, different portions of multiple images are used to calculate depths for the source images. A fourth setup 1200 is shown in FIG. 12 with inner source cameras 1242 and 1244, along with outer target cameras 1246 and 1248. In many embodiments, images captured by outer target cameras are combined to build a composite target image. Although a number of different setups are described, one skilled in the art will recognize that the systems and processes described herein can be adapted to a variety of different camera setups as appropriate to the requirements of a given application.

Figure 13:
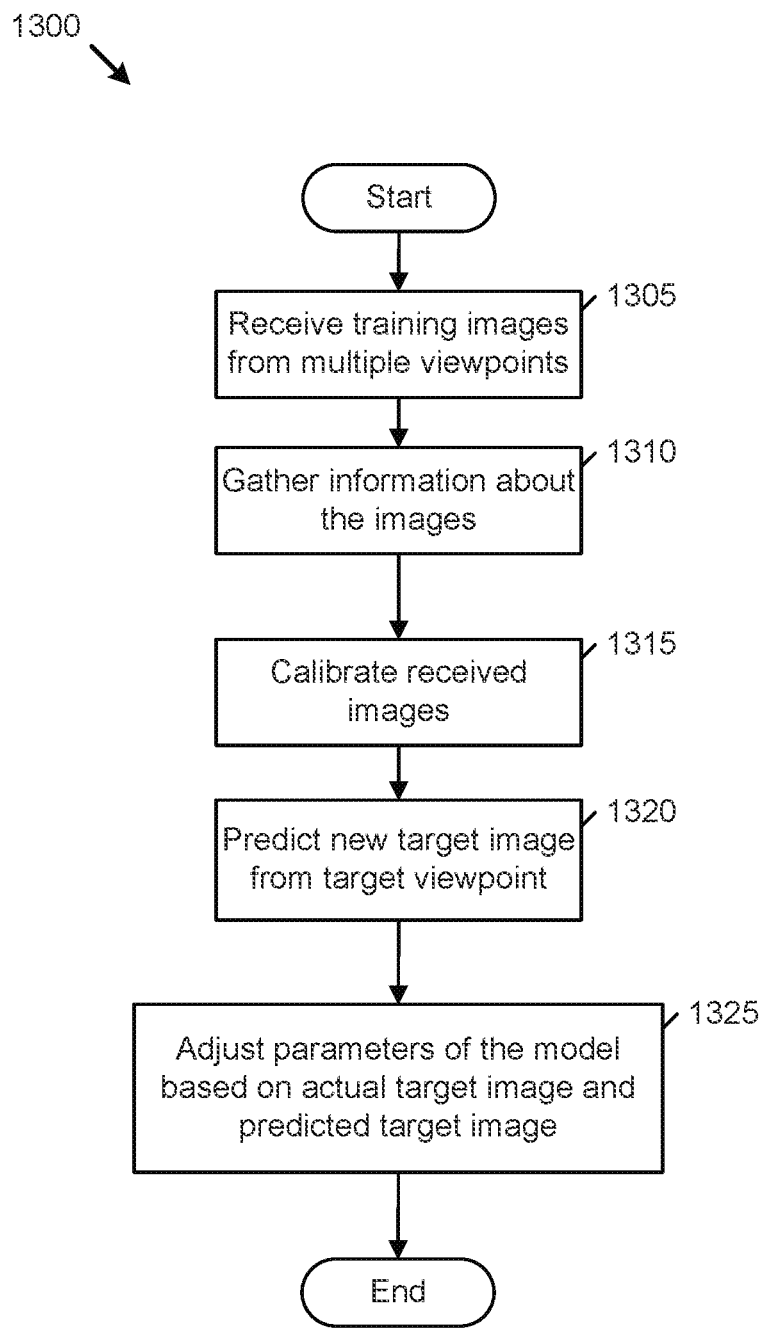
FIG. 13 conceptually illustrates a process for training a generative model based on a plurality of images in accordance with an embodiment of the invention.

A process for training a generative model based on a plurality of images captured from at least three different viewpoints is illustrated in FIG. 13. Process 1300 receives (1305) training images of a scene from at least three viewpoints. In many embodiments, training images include source images and target images (ground truth images). Source images in accordance with several embodiments of the invention are images similar to images to be captured by a depth estimation device (e.g., a stereo camera pair in a mobile phone), while target images are images that are captured for training, but are often not available on the depth estimation device. In many embodiments, the actual target image is captured by a camera array that is specifically used for capturing training data for a depth prediction system. The training images in accordance with several embodiments of the invention are captured by a multi-camera setup, where each camera of the multi-camera setup captures the scene from a different viewpoint. In a number of embodiments, the images are ideally of natural scenes in which a composition of objects results in occlusions. In some embodiments, the images are captured by a single camera at different times, where each image is shifted in time and space from the image before.

Process 1300 can also gather (1310) information about the images. In certain embodiments, the gathered information can include extrinsic information about the images. Extrinsic information in accordance with several embodiments of the invention can include information about the cameras that captured the images including (but not limited to) calibration information, sensor skew, lens aberrations, or faulty pixels. Gathered information in some embodiments of the invention includes intrinsic information about the images themselves. In a number of embodiments, intrinsic information includes (but is not limited to) image resolution, format, f-stop information, focal length, autofocus information, rolling shutter versus global shutter information, rolling shutter synchronization, color space, aperture, or time stamp information. In certain embodiments, information regarding imaging conditions such as (but not limited to) temperature information, accelerometer information, light sensor information and/or any other information that can be relevant to images captured by a camera can be recorded and utilized in the training of a generative model in accordance with an embodiment of the invention.

In some embodiments, process 1300 calibrates (1315) the received images using the gathered information. For example, in certain embodiments, images are adjusted for a variety of purposes including (but not limited to) unskewing, sharpening, perspective adjustment, adjusting faulty pixels, or noise reduction. Processes in accordance with certain embodiments of the invention do not perform any adjustments to the received images, but rather select a variety of images from many different setups and many different cameras, in order to build resilience into a model's ability to accurately generate depth and/or disparity information from new images captured using an array of cameras with characteristics that differ from the cameras used to acquire the images used to train the generative model. In certain embodiments, transfer learning can be utilized to take a generative model trained on a first camera array and adapt the generative model to generate depth and/or disparity information based upon a small set of training data obtained using a second camera array incorporating cameras having different imaging characteristics to the first camera array. In some embodiments, models are customized for different camera setups and are trained on large data sets captured with specific camera configurations.

Process 1300 predicts (1320) a new target image from a target perspective based on the received images and gathered information. In many embodiments, the received images are captured by a left and right camera of a device (e.g., a mobile phone), and the target viewpoint is from the viewpoint of a center camera between the left and right cameras. The generation of a center viewpoint in accordance with many embodiments of the invention often results in a more accurate image as there are likely to be very few regions in a natural scene captured by the central camera that are not visible in at least one of an image captured by the left camera and an image captured by the right camera. In certain embodiments, the target perspective is offset from (e.g., above or below) a center line running between the left and right cameras. In some embodiments, multiple target images are generated.

Process 1300 adjusts (1325) parameters of the model based on actual target images and generated predicted images. Adjusting the model in accordance with many embodiments of the invention includes modifying various parameters of the model based on a comparison of the actual target image (or a composite target image generated from multiple target images) and the generated predicted image. In some embodiments, processes adjust the parameters of the generative model using GAN techniques to train the model against a discriminator that attempts to distinguish between actual target images and generated targeted images. Training of the generative model allows for good representations of a target image to be generated from source images of a camera setup without a target camera. As noted above, an advantage of using such machine learning techniques is that they have an ability to learn depth cues in addition to disparity cues. Accordingly, a generative model can achieve better depth estimation performance, particularly when estimating depth in occluded regions from a stereo pair of images. Generated target images in accordance with several embodiments of the invention can allow a depth estimation application to calculate and refine depth information for source and/or target images based on the generated image.

Depth Estimation

Figure 14:
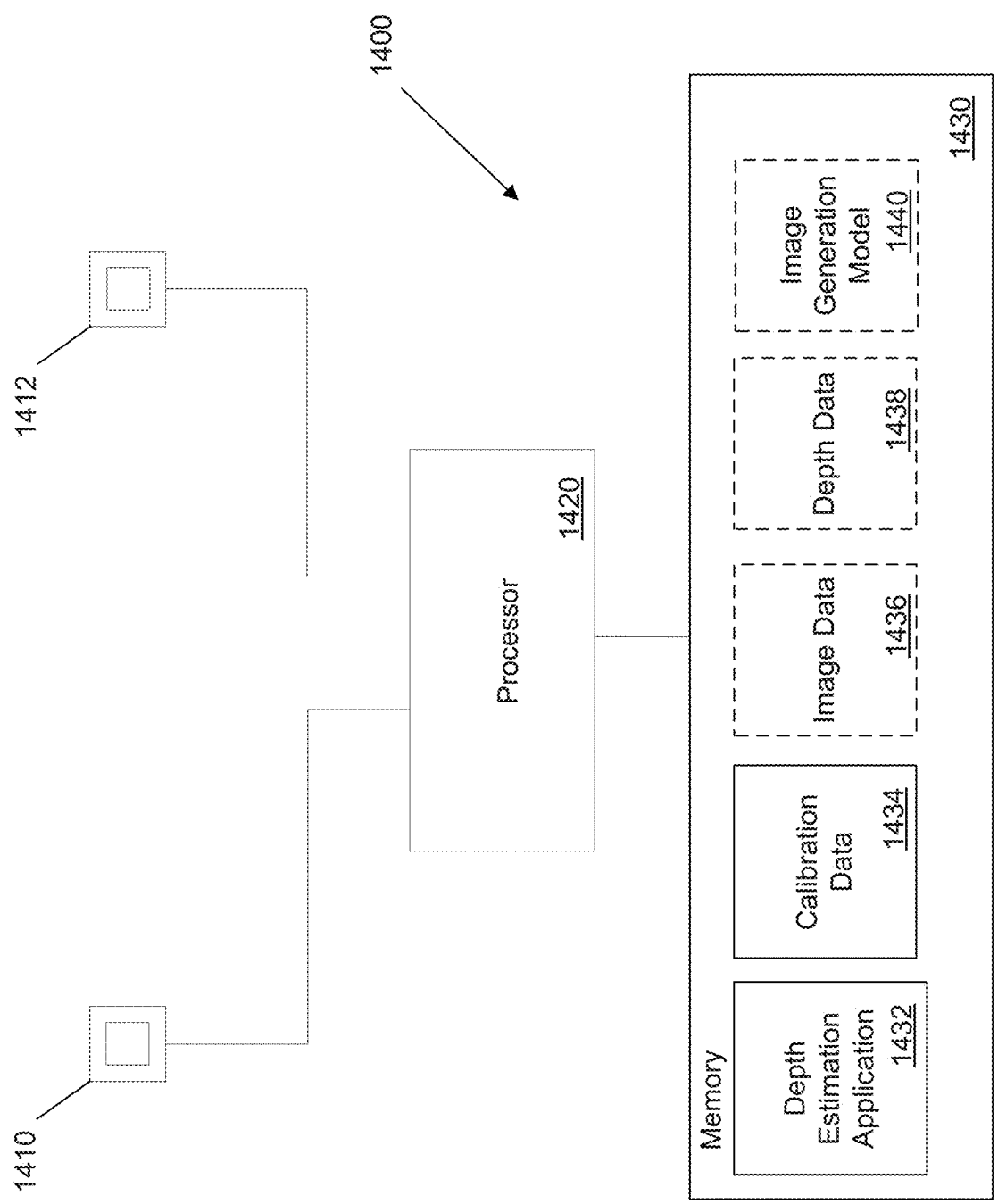
FIG. 14 illustrates a depth estimation system in accordance with an embodiment of the invention.

Once a generative model has been trained, methods in accordance with a number of embodiments of the invention use the trained model to estimate depth data for a set of images. A depth estimation system in accordance with an embodiment of the invention is conceptually illustrated in FIG. 14.

Depth estimation system 1400 can include one or more cameras 1410 and 1412 for capturing image data. In this example, cameras 1410 and 1412 are source cameras that capture image data from a number of source perspectives. In several embodiments, depth estimation systems do not have target cameras. In many embodiments, depth estimation systems are mobile phones or other consumer devices that are designed with space and cost constraints that may not allow for three or more cameras. In some embodiments, source cameras are stereo (e.g., left and right or top and bottom) cameras that can capture two of images of a scene (in many instances in a synchronized manner to account for rolling shutter of the camera image sensors). Various arrangements for the source cameras, with varying numbers of cameras, are contemplated in accordance with several embodiments of the invention.

Depth estimation system 1400 further includes a processor 1420 operatively connected to the one or more cameras and a memory 1430. Processors can be, but are not limited to, central processing units (CPUs), graphics processing units (GPUs), machine vision processors, neural network processor, application-specific integrated circuits, field-programmable gate arrays, and/or any other processing unit as appropriate to the requirements of a given application.

Memory 1430 can be any machine-readable storage device, including, but not limited to, hard disk drives (HDD), solid state drives (SSD), flash memory, RAM, or any other volatile and/or non-volatile memory type as appropriate to the requirements of a given application. Memory 1430 stores a depth estimation application 1432. Depth estimation applications in accordance with many embodiments of the invention can direct the processor to perform methods for training and/or utilizing image generation models.

Calibration data 1434 is stored on memory 1430. Calibration data can include photometric and/or geometric calibration data, which can be used to rectify images captured by the cameras. Calibration data can include any type of data which can be utilized to remove distortions, and/or rectify images in accordance with the requirements of a given application. Memory 1430 can also contain image data 1436 describing a plurality of images taken from different perspectives (or viewpoints).

Memory 1430 can also store depth and/or disparity data 1438. Depth data can describe the depths of key feature points, depth maps, edge maps, or any other depth information as appropriate to the requirements of a given application. Depth data in accordance with many embodiments of the invention includes estimated depth data that is calculated based on predicted images generated by an image generation model.

Image generation model 1440 can also be stored on memory 1430. Image generation models can be used to generate predicted target images from the image data of source cameras. Depth estimation applications can then use predicted target images to estimate depth for source images captured by source cameras of a depth estimation device.

While specific implementations of depth estimation systems have been described above with respect to FIG. 14, there are numerous configurations of depth estimation systems, including, but not limited to, those using various numbers of cameras (or no cameras at all), using distributed computing systems, and/or any other configuration as appropriate to the requirements of a given application. In numerous embodiments, depth estimation systems can be implemented in mobile devices, including, but not limited to, cellular telephones, smartphones, tablet computers, laptop computers, and/or any other device as appropriate to the requirements of a given application.

Figure 15:
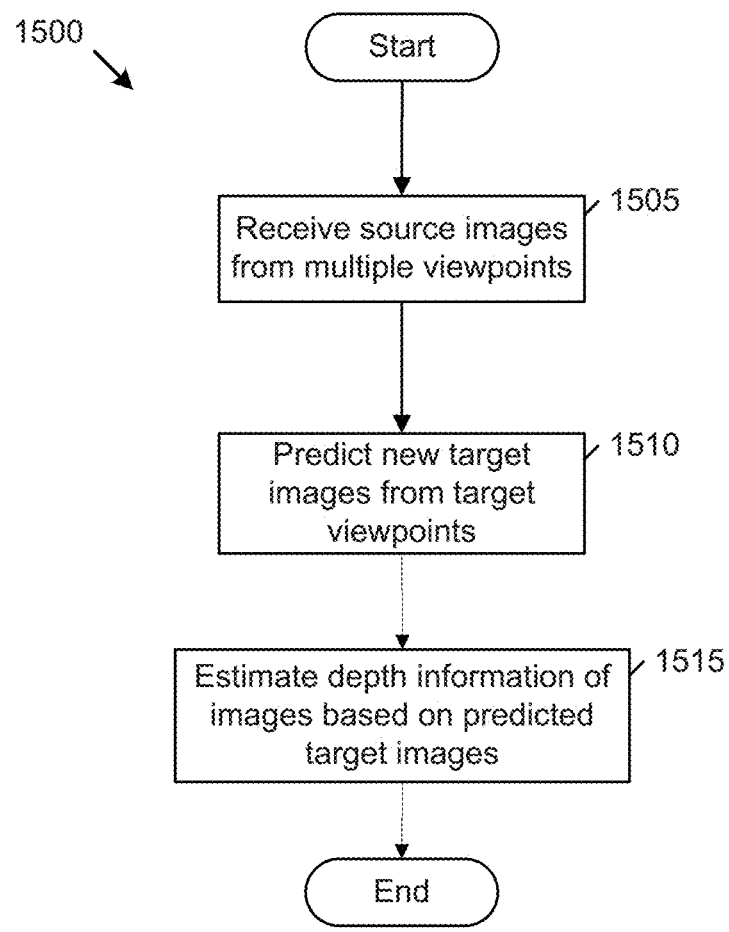
FIG. 15 conceptually illustrates a process for estimating depth from a plurality of images in accordance with an embodiment of the invention.

A process for estimating depth from a plurality of images in accordance with an embodiment of the invention is illustrated in FIG. 15. Process 1500 receives (1505) source images from multiple viewpoints. Unlike during training, received images in accordance with many embodiments of the invention do not include target images from the target perspective (e.g., a center perspective). Rather, process 1500 predicts (1510) a target image from the target perspective. Predicting target images in accordance with several embodiments of the invention is performed with an image generation model that is trained to generate an image from the target perspective from images captured at the source perspectives. In some embodiments, multiple images are generated from multiple target perspectives. In several embodiments, the generative model is trained to directly generate depth and/or disparity maps.

Process 1500 estimates (1515) depth information of the images (i.e., the received source images and/or the predicted target images) based on comparisons of the received images with the predicted images. In certain embodiments, depth information is calculated based on parallax based depth estimation techniques. In a number of embodiments, the depth and/or disparity information is warped into the viewpoint of one of the captured images. In several embodiments, the depth and/or disparity information can be utilized in the post-processing of the captured image data. For example, the depth and/or disparity information can be utilized to apply a bokeh or post capture refocus effect, and/or to perform image fusion.

Refining Depth Maps Using Generative Models

While much of the discussion above presents the use of generative models trained using sets of at least three images as an alternative to conventional disparity based depth estimation techniques, systems and methods in accordance with many embodiments of the invention can utilize a combination of disparity based depth estimation techniques and generative models. As noted above, generative models can have particular advantages in occluded regions and other regions such as (but not limited to) textureless regions in which depth estimates generated using disparity cues are typically unreliable. Accordingly, depth estimation systems and methods in accordance with a number of embodiments use a combination of traditional disparity based depth estimation techniques and generative models to produce depth and/or disparity information for images captured by a camera array.

Figure 16:
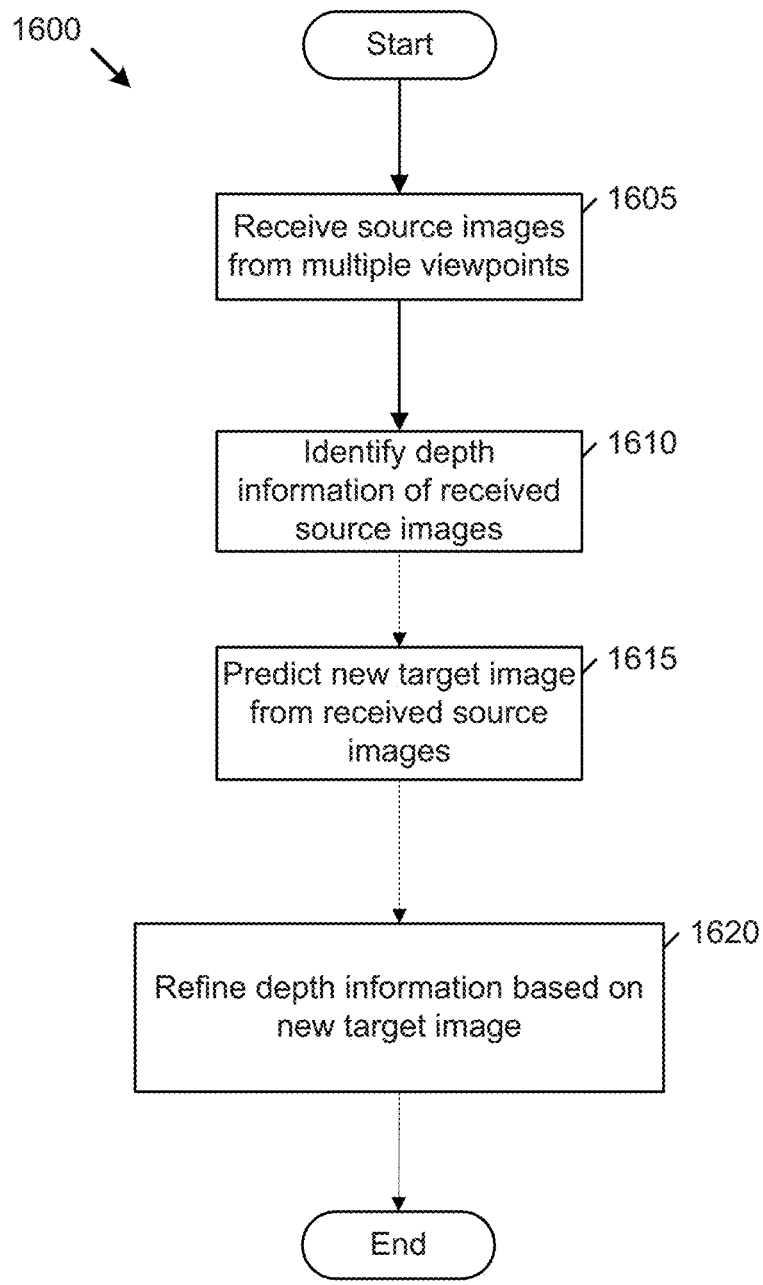
FIG. 16 conceptually illustrates a process for refining depth information for an image in accordance with an embodiment of the invention.

In some embodiments, predicted images are used to refine depth information for one or more captured images. A process for refining depth information is conceptually illustrated in FIG. 16. Process 1600 receives (1605) images captured from multiple viewpoints. In certain embodiments, the images are from a dual camera setup. Process 1600 identifies (1610) an initial set of depth information using the received images based upon conventional depth estimation techniques. The disclosures of U.S. Pat. Nos. 8,619,082 and 9,519,972 including the relevant disclosures concerning parallax detection, image synthesis, and depth estimation are hereby incorporated by reference in their entireties. In some embodiments, an initial set of depth information is identified for a first received image based upon disparity cues observed by comparison with at least a second received image. For example, in certain embodiments, an initial set of depth information for a first source image is identified using parallax based depth estimation techniques to identify corresponding pixels in a second source image. Process 1600 predicts (1615) a target image from the received images. Predicted target images in accordance with many embodiments of the invention can be generated using image prediction models similar to those outlined above based upon image data from the received source images. As can readily be appreciated, a comparison can be performed between the predicted target image and an image synthesized using the two captured images and the depth and/or disparity information and the comparison used to refine the depth and/or disparity information. In this way, the depth estimation process can leverage the additional depth cues learned by the generative model to enhance the estimated depth and/or disparity information.

Process 1600 can refine (1620) the initial depth information for the received source images to generate a modified set of depth information. Refining the initial depth information in accordance with a number of embodiments of the invention can be performed by comparing pixels of a source image with corresponding pixels in a predicted target image using estimated disparity. In some embodiments, the refinement process is performed at the edges of objects in an image and/or in areas where the initial depth estimations are uncertain. By using pixels of a generated image that may not be visible in a source image, processes in accordance with several embodiments of the invention are able to more accurately estimate the depth of each pixel in the images.

Although the present invention has been described in certain specific aspects, many additional modifications and variations would be apparent to those skilled in the art. In particular, any of the various processes described above can be performed in alternative sequences and/or in parallel (on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for estimating depth from images, the method comprising:
   receiving a plurality of source images captured from a plurality of different viewpoints using a processing system configured by an image processing application;
   generating a depth map based upon the plurality of source images using a machine learning model capable of generating a depth map for an input image using the processing system, where the machine learning model was trained using a training data set derived from images captured by at least three cameras; and
   modifying at least one output image based on the depth map using the processing system configured by the image processing application.

2. The method of claim 1, wherein the training data uses a set of ground truth training data captured using the at least three cameras to provide the image processing system with training data from which the machine learning model can learn depth cues that can be relied upon to accurately estimate depth in occlusion zones.

3. The method of claim 1, wherein the training comprises using a first source camera and second source camera to capture images and generate a depth map from the captured images using parallax-based depth estimation and a third target camera is utilized to generate ground truth images for use in the training of the generative model.

4. The method of claim 1, wherein modifying the at least one output image based on the depth map comprises applying at least one of a Bokeh effect.

5. The method of claim 1, wherein modifying the at least one output image based on the depth map comprises performing image fusion.

6. The method of claim 1, wherein the machine learning model is a Convolutional Neural Network (CNN).

7. The method of claim 1, wherein the at least one output image is an image from the plurality of source images.

8. The method of claim 1, wherein receiving the plurality of source images comprises receiving a first image captured from a first viewpoint and a second image captured from a second viewpoint that is different to the first viewpoint.

9. The method of claim 1, wherein the processing system is configured to implement the machine learning model using a set of generative model parameters stored in the memory of the processing system.

10. The method of claim 1, wherein the machine learning model comprises at least one computational model selected from the group consisting of neural network trained as a generative adversarial network (GAN), a Boltzmann machine, and a deconvolutional network.

11. The method of claim 1, wherein the machine learning model was trained using the at least three cameras comprises using at least two source cameras that are aligned with a central target camera.

12. The method of claim 1, wherein the at least three cameras share at least one sensor to enable capture of a target image using a camera module having the same or substantially similar form factor and baseline of a stereo pair of cameras from separate modules.

13. The method of claim 1, wherein the at least three cameras include source and target cameras that share a single sensor.

14. The method of claim 1, wherein the machine learning model was trained using the at least three cameras comprises using at least two source cameras positioned next to each other and at least one target camera offset above and at least one target camera offset below the at least two source cameras.

15. The method of claim 1, wherein the machine learning model was trained using the at least three cameras comprises using at least two inner source cameras positioned next to each other and at least two outer target cameras on the outsides of the respective at least two inner source cameras.

16. A non-transitory machine readable medium containing processor instructions for estimating depth from images, where execution of the instructions by a processor causes the processor to perform a process that comprises:
   receiving a plurality of source images captured from a plurality of different viewpoints using a processing system configured by an image processing application;
   generating a depth map based upon the plurality of source images using a machine learning model capable of generating a depth map for an input image using the processing system configured by the image processing application, where the machine learning model was trained using a training data set derived from images captured by at least three cameras;
   modifying at least one output image based on the depth map using the processing system configured by the image processing application.

17. The non-transitory machine readable medium of claim 16, wherein the training data uses a set of ground truth training data captured using the at least three cameras to provide the image processing system with training data from which the generative models can learn depth cues that can be relied upon to accurately estimate depth in occlusion zones.

18. The non-transitory machine readable medium of claim 16, wherein the machine learning model was trained using a first source camera and second source camera to capture images and generate a depth map from the captured images based on parallax based depth estimation and a third target camera is utilized to generate ground truth images for use in the training of the generative model.

19. The non-transitory machine readable medium of claim 16, wherein modifying the at least one output image based on the depth map comprises applying at least one of a Bokeh effect.

20. The non-transitory machine readable medium of claim 16, wherein the machine learning model comprises at least one computational model selected from the group consisting of neural network trained as a generative adversarial network (GAN), a Boltzmann machine, a Convolutional Neural Network (CNN), and a deconvolutional network.

* * * * *